US010757334B2

(12) United States Patent
Lee et al.

(10) Patent No.: US 10,757,334 B2
(45) Date of Patent: Aug. 25, 2020

(54) ACTUATOR OF CAMERA MODULE

(71) Applicant: SAMSUNG ELECTRO-MECHANICS CO., LTD., Suwon-si (KR)

(72) Inventors: Youn Joong Lee, Suwon-si (KR); Chang Seok Lee, Suwon-si (KR); Koon Shik Cho, Suwon-si (KR); Ho Kwon Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 71 days.

(21) Appl. No.: 16/170,619

(22) Filed: Oct. 25, 2018

(65) Prior Publication Data
US 2019/0289214 A1 Sep. 19, 2019

(30) Foreign Application Priority Data

Mar. 14, 2018 (KR) .................. 10-2018-0029681

(51) Int. Cl.
H04N 5/232 (2006.01)
G01D 5/245 (2006.01)
(52) U.S. Cl.
CPC ......... H04N 5/23258 (2013.01); G01D 5/245 (2013.01); H04N 5/23287 (2013.01)
(58) Field of Classification Search
CPC ........... H04N 5/23258; H04N 5/23287; H04N 5/2253; H04N 5/2251; H04N 5/23212; G01D 5/245
See application file for complete search history.

(56) References Cited

U.S. PATENT DOCUMENTS

| 6,031,351 | A | * | 2/2000 | Kawaguchi | G03B 3/02 318/630 |
| 9,661,198 | B2 | * | 5/2017 | Macours | H02P 6/183 |
| 2012/0257099 | A1 | * | 10/2012 | Tsai | G02B 7/08 348/349 |
| 2014/0327965 | A1 | * | 11/2014 | Chen | G02B 13/001 359/557 |
| 2017/0075129 | A1 | * | 3/2017 | Hsu | G02B 27/646 |
| 2017/0118408 | A1 | * | 4/2017 | Gregory | G02B 7/08 |
| 2017/0264814 | A1 | * | 9/2017 | Park | G02B 7/08 |
| 2017/0276900 | A1 | * | 9/2017 | Nishinouchi | G02B 7/09 |
| 2018/0074283 | A1 | * | 3/2018 | Ko | H02P 6/006 |
| 2018/0095341 | A1 | * | 4/2018 | Lee | G02B 7/08 |
| 2018/0188474 | A1 | * | 7/2018 | Enta | G03B 5/02 |
| 2018/0343369 | A1 | * | 11/2018 | Kim | G03B 3/10 |

FOREIGN PATENT DOCUMENTS

KR 10-1166418 B1 7/2012
KR 10-2013-0077216 A 7/2013

* cited by examiner

Primary Examiner — Nhan T Tran
(74) Attorney, Agent, or Firm — NSIP Law

(57) ABSTRACT

An actuator of a camera module includes a driving coil disposed to face a detection target; a driving circuit including a plurality of transistors connected to the driving coil; and a processor configured to provide a respective gate control signal to a gate of each of the plurality of transistors, and detect a displacement of the detection target based on a component of an oscillation signal generated in a driving signal applied to the driving coil in response to an operation of any one of the plurality of transistors being switched by the respective gate control signal.

22 Claims, 8 Drawing Sheets

ACTUATOR OF CAMERA MODULE

CROSS-REFERENCE TO RELATED APPLICATION

This application claims the benefit under 35 USC 119(a) of Korean Patent Application No. 10-2018-0029681 filed on Mar. 14, 2018, in the Korean Intellectual Property Office, the entire disclosure of which is incorporated herein by reference for all purposes.

BACKGROUND

1. Field

This application relates to an actuator of a camera module.

2. Description of Related Art

Recently, portable communications terminals, such as cellular phones, personal digital assistants (PDAs), and portable personal computers (PCs), have generally been implemented with the ability to transmit video data as well as text or audio data. In accordance with such a trend, it has been standard to install camera modules in portable communications terminals to enable the transmission of video data, for example, for use in video chatting.

Generally, a camera module includes a lens barrel having lenses disposed therein, a housing accommodating the lens barrel therein, and an image sensor for converting an image of a subject into an electrical signal. A fixed-focus type camera module capturing an image of a subject with a fixed focus may be used as the camera module. However, recently, as camera module technology has developed, a camera module including an actuator enabling autofocusing (AF) has been used. In addition, such a camera module may include an actuator for an optical image stabilization (OIS) function to suppress a decrease in resolution caused by shaking of a hand of a user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator of a camera module includes a driving coil disposed to face a detection target; a driving circuit including a plurality of transistors connected to the driving coil; and a processor configured to provide a respective gate control signal to a gate of each of the plurality of transistors, and detect a displacement of the detection target based on a component of an oscillation signal generated in a driving signal applied to the driving coil in response to an operation of any one of the plurality of transistors being switched by the respective gate control signal.

The actuator of a camera model may further include a memory configured to store instructions executable by the processor, and the processor may be further configured to execute the instructions to configure the processor to provide the respective gate control signal to the gate of each of the plurality of transistors, and detect the displacement of the detection target based on the component of the oscillation signal generated in the driving signal applied to the driving coil in response to the operation of any one of the plurality of transistors being switched by the respective gate control signal.

The processor may be further configured to detect the displacement of the detection target based on the oscillation signal generated in the driving signal in response to any one of the plurality of transistors being switched from a turn-on operation to a turn-off operation.

The processor may be further configured to count cycles of the oscillation signal to detect a frequency of the oscillation signal.

The frequency of the oscillation signal may change depending on the displacement of the detection target.

The detection target may be positioned within a range of a magnetic field of the driving coil.

The detection target may be disposed on one side of a lens barrel of the camera module.

The detection target may include either one or both of a conductor and a magnetic material.

The oscillation signal may be generated by an inductance of the driving coil and a parasitic capacitance connected in parallel with the driving coil.

The oscillation signal may be generated by an LC oscillation of the inductance and the parasitic capacitance.

The driving circuit may include a first path transistor group forming a first path of the driving signal; and a second path transistor group forming a second path of the driving signal, the second path of the driving signal being different from the first path of the driving signal.

The oscillation signal may be generated during a sensing period within either one or both of a first operation period of the first path transistor group and a second operation period of the second path transistor group.

In the sensing period, at least one transistor in a corresponding one of the first path transistor group and the second path transistor group is turned off for a predetermined time period.

The oscillation signal may be generated in an operation switching period between a first operation period of the first path transistor group and a second operation period of the second path transistor group.

In another general aspect, an actuator of a camera module includes a lens barrel; a driving coil configured to provide a driving force to the lens barrel; a driver configured to provide a driving signal to the driving coil; and a processor configured to detect a displacement of the lens barrel based on a component of an oscillation signal generated in the driving signal in response to a change in a level of the driving signal provided to the driving coil.

The actuator of a camera module may further include a memory configured to store instructions executable by the processor, and the processor may be further configured to execute the instructions to configure the processor to detect the displacement of the lens barrel based on the component of the oscillation signal generated in the driving signal in response to the change in the level of the driving signal provided to the driving coil.

The processor may be further configured to detect the displacement of the detection target based on a change in a frequency of the oscillation signal.

The processor may be further configured to count cycles of the oscillation signal for a predetermined time period to detect a frequency of the oscillation signal.

In another general aspect, a processor-implemented method of controlling an actuator of a camera module includes providing a respective gate control signal to a gate of each of a plurality of transistors connected to a driving coil facing a detection target to periodically switch the plurality of transistors on and off to apply a driving signal to the driving coil to cause the driving coil to apply a driving force to the detection target to move the detection target; and detecting a displacement of the detection target based on an oscillation signal generated in the driving signal by the switching of the plurality of transistors, the oscillation signal having a frequency that varies as the detection target moves.

The driving signal may cause a driving current to flow through the driving coil, and the periodically switching of the transistors on and off may cause a direction of the driving current flowing through the driving coil to periodically reverse.

The oscillation signal may be generated by oscillation of a tank circuit including an inductance of the driving coil and a parasitic capacitance connected in parallel with the inductance of the driving coil, and the oscillation of the tank circuit may occur in response to at least one of the plurality of transistors being turned off.

The detecting of the displacement of the detection target may include detecting a frequency of the oscillation signal; and converting the frequency of the oscillation signal to a position of the detection target.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
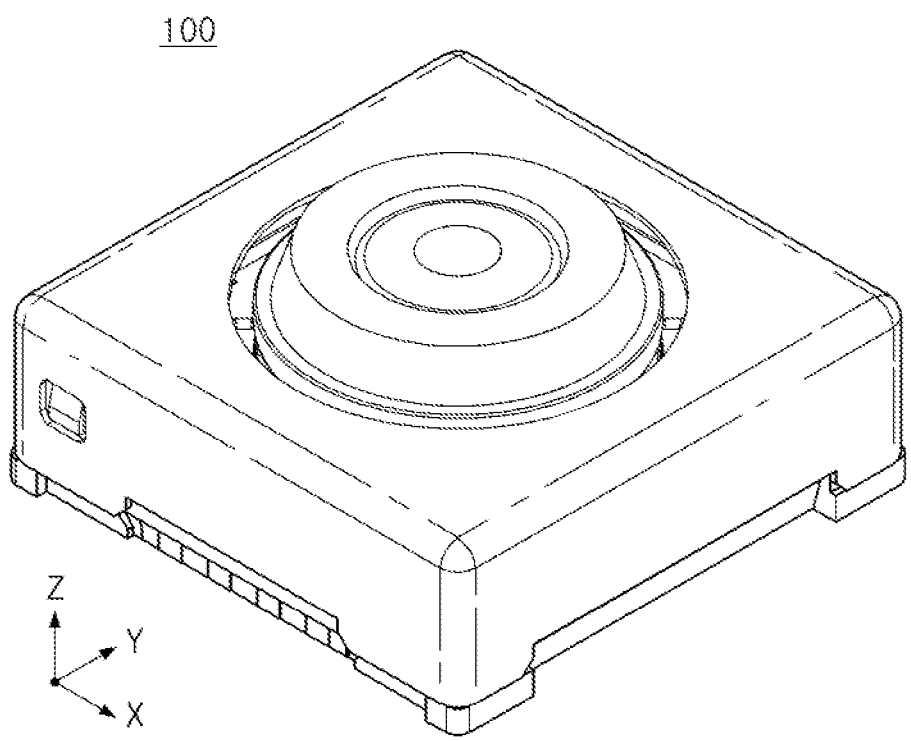
FIG. 1 is a perspective view illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 2:
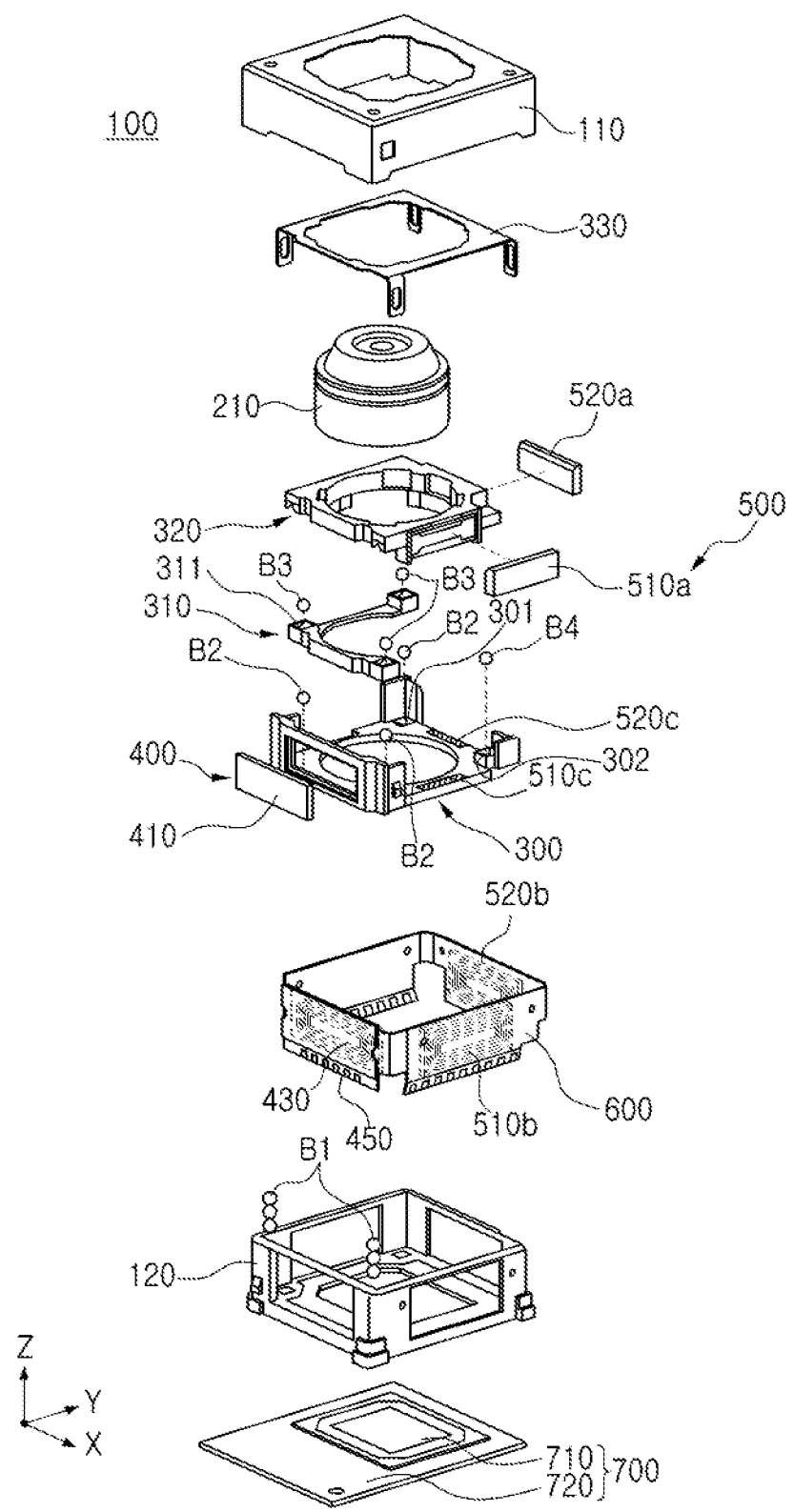
FIG. 2 is a schematic exploded perspective view illustrating an example of the camera module of FIG. 1.

FIG. 1 is a perspective view illustrating an example of a camera module, and FIG. 2 is a schematic exploded perspective view illustrating an example of the camera module of FIG. 1.

Referring to FIGS. 1 and 2, a camera module 100 includes a lens barrel 210 and an actuator moving the lens barrel 210. In addition, the camera module 100 includes a case 110 and a housing 120 accommodating the lens barrel 210 and the actuator therein, and further includes an image sensor module 700 converting light incident thereto through the lens barrel 210 into an electrical signal.

The lens barrel 210 has a hollow cylindrical shape to accommodate a plurality of lenses for capturing an image of a subject therein, and the plurality of lenses are mounted in the lens barrel 210 along an optical axis. The number of lenses disposed in the lens barrel 210 depend on a design of the lens barrel 210, and the lenses may have optical characteristics such as a radius of curvature of an object-side surface, a radius of curvature of an image-side surface, a thickness, a distance to a next lens, a refractive index, an Abbe number, aspheric coefficients of the lens surfaces, and an inflection point. The lenses may have the same refractive index or different refractive indices.

The actuator moves the lens barrel 210. As an example, the actuator moves the lens barrel 210 in an optical-axis direction (the Z-axis direction in FIG. 2) to focus the lenses, and moves the lens barrel 210 in a direction (an X-axis direction or a Y-axis direction in FIG. 2) perpendicular to the optical axis (the Z-axis) to correct shaking at the time of capturing an image. The actuator includes a focusing assembly 400 for focusing the lenses and a shake correction assembly 500 for correcting the shake.

The image sensor module 700 converts the light incident thereto through the lens barrel 210 into the electrical signal. As an example, the image sensor module 700 includes an image sensor 710 and a printed circuit board 720 connected to the image sensor 710, and may further include an infrared filter (not illustrated in FIG. 2). The infrared filter blocks light in an infrared region in the light incident thereto through the lens barrel 210. The image sensor 710 converts the light incident thereto through the lens barrel 210 into the electrical signal. As an example, the image sensor 710 may include a charge-coupled device (CCD) or a complementary metal-oxide-semiconductor (CMOS) device. The electrical signal converted by the image sensor 710 may be output as an image on a display of a portable electronic device in which the camera module 100 is mounted (not illustrated in FIG. 2). The image sensor 710 may be mounted on the printed circuit board 720, and may be electrically connected to the printed circuit board 720 by wire bonding.

The lens barrel 210 and the actuator are accommodated in the housing 120. As an example, the housing 120 may have an open top and an open bottom, and the lens module 210 and the actuator may be accommodated in an internal space of the housing 120. The image sensor module 700 may be disposed on the bottom of the housing 120.

The case 110 is coupled to the housing 120 to surround outer surfaces of the housing 120, and protects internal components of the camera module 100. In addition, the case 110 may shield electromagnetic waves. As an example, the case 110 may shield electromagnetic waves generated by the camera module 100 so that the electromagnetic waves do not have an influence on other electronic components in the portable electronic device. In addition, since several electronic components as well as the camera module 100 are mounted in the portable electronic device, the case 110 may shield electromagnetic waves generated from these electronic components so that the electromagnetic waves do not have an influence on the camera module 100. The case 110 may be made of metal and may be grounded to a ground pad provided on the printed circuit board 720 to shield the electromagnetic waves.

As described above, the actuator includes the focusing assembly 400 for focusing the lenses and the shake correction assembly 500 for correcting the shaking.

The focusing assembly 400 includes a magnet 410 and a driving coil 430 for generating a driving force to move the lens barrel 210 and a carrier 300 accommodating the lens barrel 210 therein in the optical-axis (Z-axis) direction.

The magnet 410 is mounted on the carrier 300. As an example, the magnet 410 may be mounted on one surface of the carrier 300. The driving coil 430 is mounted on the housing 120, and is disposed to face the magnet 410. As an example, the driving coil 430 may be disposed on one surface of a substrate 600, and the substrate 600 is mounted on the housing 120.

In the example illustrated in FIG. 2, the magnet 410 is mounted on the carrier 300 to move in the optical-axis (Z-axis) direction together with the carrier 300, and the driving coil 430 is fixed to the housing 120. However, in another example, positions of the magnet 410 and the driving coil 430 may be exchanged with each other. When a driving signal is applied to the driving coil 430, the carrier 300 is moved in the optical-axis (Z-axis) direction by an electromagnetic interaction between the magnet 410 and the driving coil 430.

Since the lens barrel 210 is accommodated in the carrier 300, the lens barrel 210 is also moved in the optical-axis (Z-axis) direction by the movement of the carrier 300. In addition, since a frame 310 and a lens holder 320 are accommodated in the carrier 300, the frame 310, the lens holder 320, and the lens barrel 210 are also moved together in the optical-axis (Z-axis) direction by the movement of the carrier 300.

Rolling members B1 are disposed between the carrier 300 and the housing 120 to reduce friction between the carrier 300 and the housing 120 when the carrier 300 is moved. The rolling members B1 may have a ball form. The rolling members B1 may be disposed at opposite ends of the magnet 410.

A yoke 450 is disposed on the housing 120. As an example, the yoke 450 may be mounted on the substrate 600 and disposed on the housing 120. The yoke 450 may be provided on the other surface of the substrate 600. Therefore, the yoke 450 may be disposed to face the magnet 410 with the driving coil 430 interposed therebetween. An attractive force acts in the direction perpendicular to the optical axis (Z-axis) between the yoke 450 and the magnet 410. Therefore, the rolling members B1 may be maintained in a state in which they are held in contact with the carrier 300 and the housing 120 by the attractive force between the yoke 450 and the magnet 410. In addition, the yoke 450 may concentrate a magnetic force of the magnet 410 to prevent generation of a leakage magnetic flux. As an example, the yoke 450 and the magnet 410 may form a magnetic circuit.

In the examples disclosed in this application, in a focusing process, a closed-loop control manner of sensing and feeding back a position of the lens barrel 210 is used. Therefore, a position detector is provided to perform a closed-loop control. The position detector detects the position of the lens barrel 210.

The shake correction unit 500 is used to correct image blurring or moving picture shaking caused by shaking of a hand of a user at the time of capturing an image or a moving picture. For example, when the shaking is generated at the time of capturing the image due to the shaking of the hand of the user, the shake correction unit 500 compensates for the shaking by causing the lens barrel 210 to be displaced to correspond to the shaking. As an example, the shake correction unit 500 moves the lens barrel 210 in the direction perpendicular to the optical axis (the Z-axis) to correct the s shake.

The shake correction unit 500 includes a plurality of magnets 510a and 520a and a plurality of driving coils 510b and 520b generating a driving force to move a the frame 310, the lens holder 320, and the lens barrel 210 in the direction perpendicular to the optical axis (the Z-axis). The frame 310 and the lens holder 320 are inserted into the carrier 300 and disposed in the optical-axis (Z-axis) direction, and guide the movement of the lens barrel 210. The frame 310 and the lens holder 320 have a space into which the lens barrel 210 is inserted. The lens barrel 210 may be inserted and fixed into the lens holder 320.

The frame 310 and the lens holder 320 are moved in the direction perpendicular to the optical axis (the Z-axis) with respect to the carrier 300 by the driving force generated by the plurality of magnets 510a and 520a and the plurality of driving coils 510b and 520b. One 510a of the plurality of magnets 510a and 520a and one 510b of the plurality of driving coils 510b and 520b generate a driving force in a first-axis (Y-axis) direction perpendicular to the optical axis (the Z-axis), and the other 520a of the plurality of magnets 510a and 520a and the other 520b of the plurality of driving coils 510b and 520b generates a driving force in a second-axis (X-axis) direction perpendicular to a first axis (a Y-axis). The second axis (the X-axis) is an axis perpendicular to both the optical axis (the Z-axis) and the first axis (the Y-axis). The plurality of magnets 510a and 520a are disposed to be orthogonal to each other on a plane perpendicular to the optical axis (the Z-axis).

The plurality of magnets 510a and 520a are mounted on the lens holder 320, and the plurality of driving coils 510b and 520b facing the plurality of magnets 510a and 520a, respectively, are disposed on the substrate 600 and the substrate 600 is mounted on the housing 120.

The plurality of magnets 510a and 520a are moved in the direction perpendicular to the optical axis (the Z-axis) together with the lens holder 320, and the plurality of driving coils 510b and 520b may be fixed to the housing 120. However, in another example, positions of the plurality of magnets 510a and 520a and the plurality of driving coils 510b and 520b may be exchanged with each other.

In the examples disclosed in this application, in a shake correction process, a closed-loop control manner of sensing and feeding back a position of the lens barrel 210 is used. Therefore, the position detector is provided to perform a closed-loop control. The position detector detects the position of the lens barrel 210.

The camera module 100 includes a plurality of ball members supporting the shake correction unit 500. The plurality of ball members serve to guide movement of the frame 310, the lens holder 320, and the lens barrel 210 in the shake correction process. In addition, the plurality of ball members serve to maintain a spacing between the carrier 300 and the frame 310, and a spacing between the frame 310 and the lens holder 320.

The plurality of ball members include first ball members B2 and second ball members B3. The first ball members B2 guide movement of the frame 310, the lens holder 320, and the lens barrel 210 in the first-axis (Y-axis) direction, and the second ball members B3 guide movement of the lens holder 320 and the lens barrel 210 in the second-axis (X-axis) direction.

As an example, the first ball members B2 are moved in a rolling motion in the first-axis (Y-axis) direction when a driving force in the first-axis (Y-axis) direction is generated. Therefore, the first ball members B2 guide the movement of the frame 310, the lens holder 320, and the lens barrel 210 in the first-axis (Y-axis) direction. In addition, the second ball members B3 are moved in a rolling motion in the second-axis (X-axis) direction when a driving force in the second-axis (X-axis) direction is generated. Therefore, the second ball members B3 guide the movement of the lens holder 320 and the lens barrel 210 in the second-axis (X-axis) direction.

The first ball members B2 include a plurality of ball members disposed between the carrier 300 and the frame 310, and the second ball members B3 include a plurality of ball members disposed between the frame 310 and the lens holder 320.

First guide groove portions 301 accommodating the first ball members B2 therein are formed in surfaces of the carrier 300 and the frame 310 facing each other in the optical-axis (Z-axis) direction. The first guide groove portions 301 include a plurality of guide grooves corresponding to the plurality of ball members of the first ball members B2. The first ball members B2 are accommodated in the first guide groove portions 301 and are fitted between the carrier 300 and the frame 310. Movement of the first ball members B2 is restricted in the optical-axis (Z-axis) direction and the second-axis (X-axis) direction so that the first ball members B2 may be moved in only the first-axis (Y-axis) direction in a state in which the first ball members B2 are accommodated in the first guide groove portions 301. As an example, the first ball members B2 may be moved in a rolling motion in only the first-axis (Y-axis) direction. To this end, a shape of each of the plurality of guide grooves of the first guide groove portions 301 in a plane perpendicular to the optical axis (the Z-axis) may be a rectangular shape having a length in the first-axis (Y-axis) direction.

Second guide groove portions 311 accommodating the second ball members B3 therein are formed in surfaces of the frame 310 and the lens holder 320 facing each other in the optical-axis (Z-axis) direction. The second guide groove portions 311 may include a plurality of guide grooves corresponding to the plurality of ball members of the second ball members B3.

The second ball members B3 may be accommodated in the second guide groove portions 311 and be fitted between the frame 310 and the lens holder 320. Movement of the second ball members B3 is restricted in the optical-axis (Z-axis) direction and the first-axis (Y-axis) direction so that the second ball members B3 may be moved in only the second-axis (X-axis) direction in a state in which the second ball members B3 are accommodated in the second guide groove portions 311. As an example, the second ball members B3 may be moved in a rolling motion in only the second-axis (X-axis) direction. To this end, a shape of each of the plurality of guide grooves of the second guide groove portions 311 in a plane perpendicular to the optical axis (Z-axis) may be a rectangular shape having a length in the second-axis (X-axis) direction.

A third ball member B4 supporting movement of the lens holder 320 is provided between the carrier 300 and the lens holder 320. The third ball member B4 guides both movement of the lens holder 320 in the first-axis (Y-axis) direction and movement of the lens holder 320 in the second-axis (X-axis) direction.

As an example, the third ball member B4 is moved in a rolling motion in the first-axis (Y-axis) direction when a driving force in the first-axis (Y-axis) direction is generated. Therefore, the third ball member B4 guides the movement of the lens holder 320 in the first-axis (Y-axis) direction.

In addition, the third ball member B4 is moved in a rolling motion in the second-axis (X-axis) direction when a driving force in the second-axis (X-axis) direction is generated. Therefore, the third ball member B4 guides the movement of the lens holder 320 in the second-axis (X-axis) direction.

Thus, the second ball members B3 and the third ball member B4 are in contact with and support the lens holder 320.

Third guide groove portions 302 accommodating the third ball member B4 therein are formed in surfaces of the carrier 300 and the lens holder 320 facing each other in the optical-axis (Z-axis) direction. The third ball member B4 are accommodated in the third guide groove portions 302 and fitted between the carrier 300 and the lens holder 320. Movement of the third ball member B4 is restricted in the optical-axis (Z-axis) direction, and the third ball member B4 may be moved in a rolling motion in the first-axis (Y-axis) direction and the second-axis (X-axis) direction in a state in which the third ball member B4 is accommodated in the third guide groove portions 302. To this end, a shape of each of the third guide groove portions 302 in a plane perpendicular to the optical axis (the Z-axis) may be a circular shape. Therefore, the third guide groove portions 302 may have a shape in a plane perpendicular to the optical axis (the Z-axis) that is different from the shape of the first guide groove portions 301 in a plane perpendicular to the optical axis (the Z-axis) and the shape of the second guide groove portions 311 in a plane perpendicular to the optical axis (the Z-axis).

The first ball members B2 are movable in a rolling motion in only the first-axis (Y-axis) direction, the second ball members B3 are movable in a rolling motion in only the second-axis (X-axis) direction, and the third ball member B4 is movable in a rolling motion in both the first-axis (Y-axis) direction and the second-axis (X-axis) direction. Therefore, the first ball members B2, the second ball members B3, and the third ball member B4 supporting the shake correction unit 500 have different degrees of freedom. A degree of freedom refers to a number of independent variables needed to represent a motion state of an object in a three-dimensional (3D) coordinate system. Generally, in the 3D coordinate system, a degree of freedom of an object may be 6. Movement of the object may be represented by an orthogonal coordinate system having three directions and a rotary coordinate system having three directions. As an example, in the 3D coordinate system, the object may be moved in a translation motion along the X-axis, the Y-axis, and the Z-axis, and may be moved in a rotation motion relative to the X-axis, the Y-axis, and the Z-axis.

In this application, a degree of freedom refers to a number of independent variables needed to represent movement of the first ball members B2, the second ball members B3, and the third ball member B4 when the shake correction unit 500 is moved by the driving force generated in the direction perpendicular to the optical axis (the Z-axis) by applying electric power to the shake correction unit 500. As an example, the third ball member B4 may be moved in a rolling motion along two axes (the first axis (the Y-axis) and the second axis (the X-axis)), and the first ball members B2 and the second ball members B3 may be moved in a rolling motion along only one axis (the first axis (the Y-axis) in the case of first ball members B2) and the second axis (the (the X-axis) in the case of the second ball members B3) by the driving force generated in the direction perpendicular to the optical axis (the Z-axis). Therefore, a degree of freedom of the third ball member B4 is greater than a degree of freedom of the first ball members B2 and a degree of freedom of the second ball members B3.

When the driving force in the first-axis (Y-axis) direction is generated, the frame 310, the lens holder 320, and the lens barrel 210 are moved together in the first-axis (Y-axis) direction. In this case, the first ball members B2 and the third ball member B4 are moved in a rolling motion along the first axis (the Y-axis), and the movement of the second ball members B3 is restricted.

In addition, when the driving force in the second-axis (X-axis) direction is generated, the lens holder 320 and the lens barrel 210 are moved in the second-axis (X-axis) direction. In this case, the second ball members B3 and the third ball member B4 are moved in a rolling motion along the second axis (the X-axis), and the movement of the first ball members B2 is restricted.

A plurality of yokes 510c and 520c are provided so that the shake correction unit 500 and the first to third ball members B2, B3, and B4 are maintained in a state in which they are in contact with each other. The plurality of yokes 510c and 520c are fixed to the carrier 300, and are disposed to face the plurality of magnets 510a and 520a, respectively, in the optical-axis (Z-axis) direction. Therefore, an attractive force is generated in the optical-axis (Z-axis) direction between the plurality of yokes 510c and 520c and the plurality of magnets 510a and 520a. Since the shake correction unit 500 is pressed toward the plurality of yokes 510c and 520c by the attractive force between the plurality of yokes 510c and 520c and the plurality of magnets 510a and 520a, the frame 310 and the lens holder 320 are maintained in a state in which they are in contact with the first to third ball members B2, B3, and B4. The plurality of yokes 510c and 520c are made of a material capable of generating the attractive force between the plurality of yokes 510c and 520c and the plurality of magnets 510a and 520a. As an example, the plurality of yokes 510c and 520c may be made of a magnetic material.

The plurality of yokes 510c and 520c are provided so that the frame 310 and the lens holder 320 are maintained in the state in which they are in contact with the first to third ball members B2, B3, and B4, and a stopper 330 is provided to prevent the first to third ball members B2, B3, and B4, the frame 310, and the lens holder 320 from being separated from the carrier 300 due to an external impact or other disturbance. The stopper 330 is coupled to the carrier 300 to cover at least a portion of an upper surface of the lens holder 320.

Figure 3:
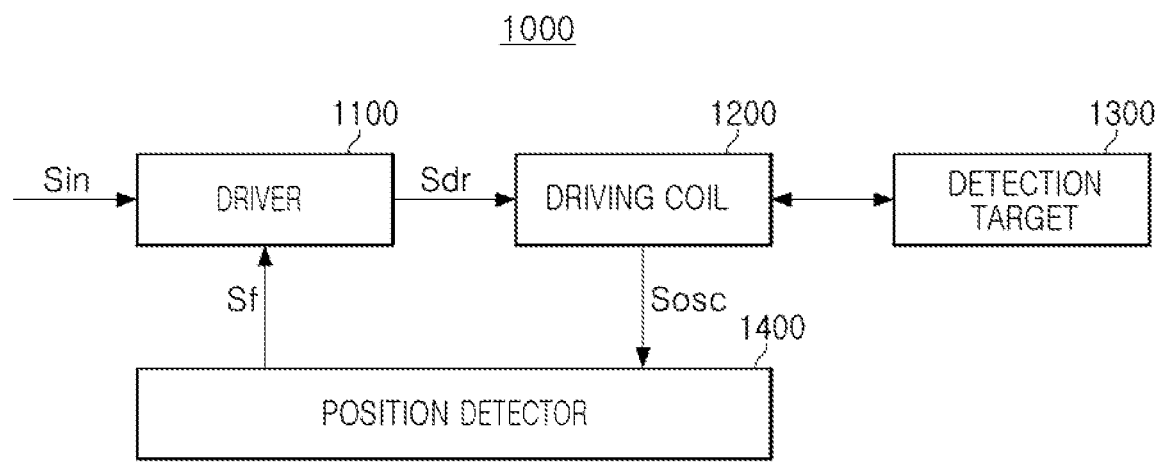
FIG. 3 is a block diagram illustrating an example of an actuator used in the camera module of FIGS. 1 and 2.

FIG. 3 is a block diagram illustrating an example of an actuator used in the camera module of FIGS. 1 and 2.

Referring to FIG. 3, an actuator 1000 corresponds to either the focusing unit 400 of the shake correction unit 500 of FIG. 2.

When the actuator 1000 of FIG. 3 corresponds to the focusing unit 400 of FIG. 2, the actuator 1000 moves the lens barrel 210 in the optical-axis (Z-axis) direction to perform an autofocusing (AF) function of the camera module 100. Therefore, when the actuator 1000 of FIG. 3 performs the autofocusing function, a driver 1100 applies a driving signal to a driving coil 1200 to provide a driving force in the optical-axis (Z-axis) direction to the lens barrel 210.

When the actuator 1000 of FIG. 3 corresponds to the shake correction unit 500 of FIG. 2, the actuator 1000 moves the lens barrel 210 in a direction perpendicular to the optical axis (Z-axis) to perform an optical image stabilization (OIS) function of the camera module 100. Therefore, when the actuator 1000 of FIG. 3 performs the optical image stabilization function, the driver 1100 applies the driving signal to the driving coil 1200 to provide a driving force in the direction perpendicular to the optical axis (the Z-axis) to the lens barrel 210. There will in fact be two actuators 1000 corresponding to the shake correction unit 500 of FIG. 2, one actuator to move the lens barrel 210 in the first-axis (Y-axis)

direction, and another actuator to move the lens barrel 210 in the second-axis (X-axis) direction.

The actuator 1000 includes the driver 1100, the driving coil 1200, a detection target 1300, and a position detector 1400.

The driver 1100 generates a driving signal Sdr depending on an input signal Sin applied from an external source and a feedback signal Sf generated by the position detector 1400, and applies the generated driving signal Sdr to the driving coil 1200.

When the driving signal Sdr is applied from the driver 1100 to the driving coil 1200, the lens barrel moves in the optical-axis direction or the direction perpendicular to the optical axis due to an electromagnetic interaction between the driving coil 1200 and the detection target 1300. As an example, the driving signal Sdr may be provided as either a current or a voltage to the driving coil 1200.

The position detector 1400 detects a position of the detection target 1300 to generate the feedback signal Sf, and provides the feedback signal Sf to the driver 1100. In one example, the detection target 1300 may be provided on one side of the lens barrel 210 to move in the same direction as a moving direction of the lens barrel 210. In another example, the detection target 1300 may be provided on any one or any combination of any two or more of the carrier 300, the frame 310, and the lens holder 320 coupled to the lens barrel, in addition to the lens barrel 210. Therefore, the position detector 1400 may detect a displacement of the lens barrel by detecting the position of the detection target 1300.

The detection target 300 provided on one side of the lens barrel in one example is disposed to face the driving coil 1200. The detection target 1300 may be made of either one or both of a magnetic material and a conductor. As an example, the detection target 1300 may correspond to the magnet 410, 510a, or 520a (see FIG. 2) disposed to face the driving coil 1200, and may be provided as a separate element in another example.

The position detector 1400 detects the position of the detection target 1300 based on a frequency of an oscillation signal Sosc obtained from the driving coil 1200. The frequency of the oscillation signal Sosc obtained from the driving coil 1200 varies depending on the position of the detection target 1300. In detail, the detection target 1300 is positioned in a range of a magnetic field of the driving coil 1200. Therefore, when the detection target 1300 made of either one or both of the magnetic material and the conductor moves together with the lens barrel 210, a strength of the magnetic field of the driving coil 1200 changes, and thus an inductance of the driving coil 1200 changes. Therefore, the frequency of the oscillation signal Sosc changes depending on the movement of the detection target 1300.

Figure 4:
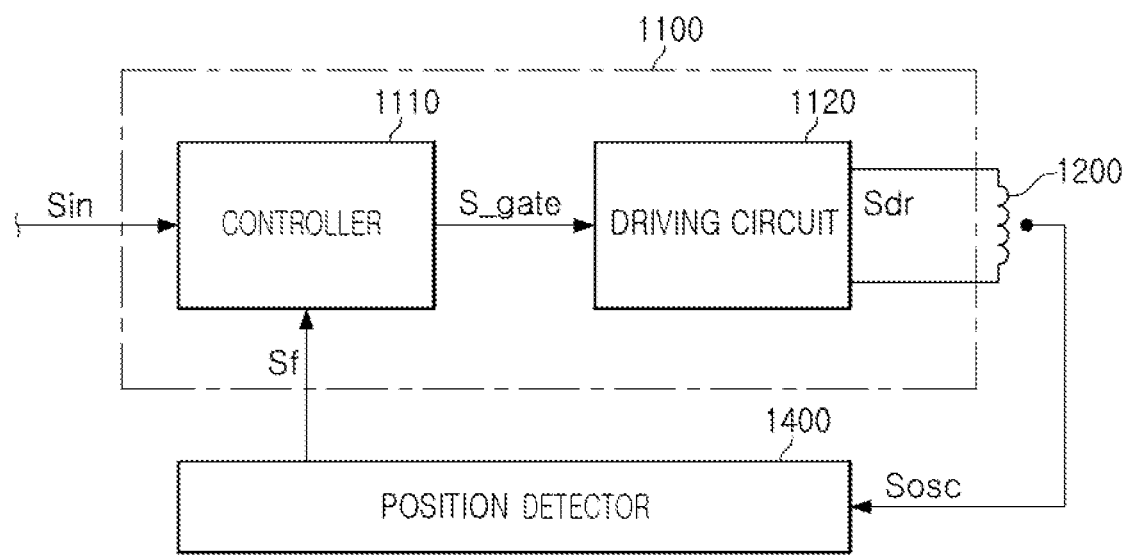
FIG. 4 is a block diagram illustrating an example of components of the actuator of FIG. 3 in more detail.

FIG. 4 is a block diagram illustrating an example of components of the actuator of FIG. 3 in more detail.

Referring to FIG. 4, the driver 1100 includes a controller 1110 and a driving circuit 1120. The driver of FIG. 4 may be implemented by a driver integrated circuit (IC).

The controller 1110 generates a control signal S_gate from the input signal Sin and the feedback signal Sf provided from the position detector 1400. In detail, the controller 1110 compares the input signal Sin indicating a target position of the lens barrel 210 with the feedback signal Sf indicating a current position of the lens barrel 210 and generates the control signal S_gate based on a result of the comparing.

The driving circuit 1120 generates the driving signal Sdr based on the control signal S_gate, and provides the driving signal Sdr to the driving coil 1200. The driving signal Sdr is provided as either a current or a voltage to both ends of the driving coil 1200. The lens barrel 210 is moved to the target position by the driving signal Sdr generated by the driving circuit 1120 and provided to the driving coil 1200.

The driving circuit 1120 includes an H bridge circuit that is bidirectionally driven by the control signal S_gate to apply the driving signal Sdr to the driving coil 1200. The H bridge circuit may include a plurality of transistors connected to both ends of the driving coil 1200 in an H bridge form. When the driving circuit 1120 is driven in a voice coil motor manner, the control signal S_gate provided from the controller 1110 is applied to gates of the transistors included in the H bridge circuit.

Figure 5:
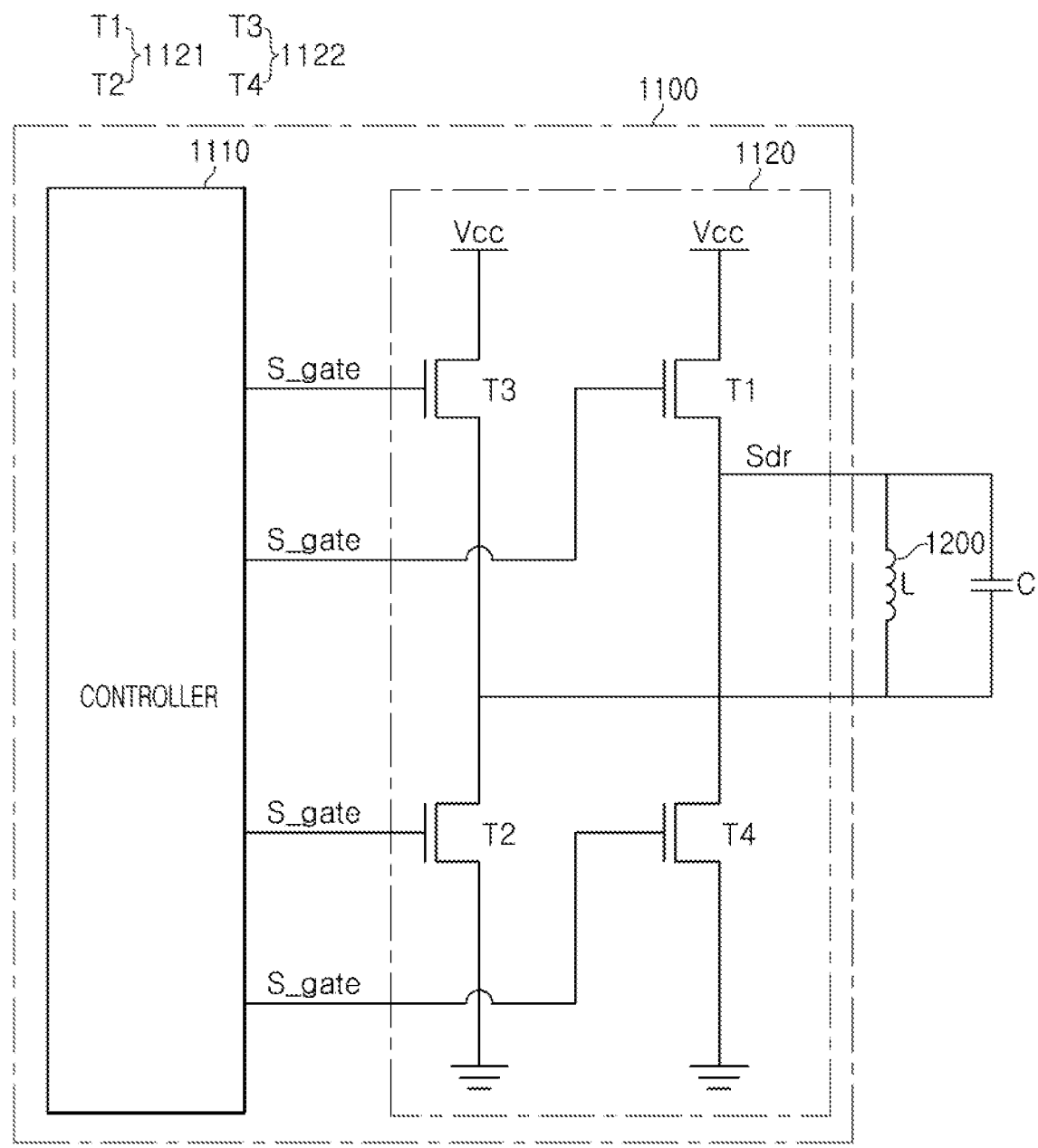
FIG. 5 is a circuit diagram illustrating an example of a driving circuit of a driver of FIG. 4 in detail.

FIG. 5 is a circuit diagram illustrating an example of a driving circuit of the driver of FIG. 4 in detail.

Referring to FIG. 5, the driving circuit 1120 includes a plurality of transistors T1, T2, T3, and T4 connected to the driving coil 1200 in an H bridge form. In detail, the driving circuit 1120 includes a first path transistor group 1121 and a second path transistor group 1122.

The first path transistor group 1121 includes a first transistor T1 and a second transistor T2. The first transistor T1 is connected between a driving power supply Vcc and a first end of the driving coil 1200, and the second transistor T2 is connected between a second end of the driving coil 1200 and a ground.

The first path transistor group 1121 forms a first path of the driving signal Sdr applied to the driving coil 1200 depending on respective control signals S_gate provided from the controller 1110. As an example, the control signals S_gate are provided to gates of the first transistor T1 and the second transistor T2. As an example, when the control signals S_gate are at a high level, the first transistor T1 and the second transistor T2 are turned on, and when the control signals S_gate are at a low level, the first transistor T1 and the second transistor T2 are turned off.

The second path transistor group 1122 includes a third transistor T3 and a fourth transistor T4. The third transistor T3 is connected between the driving power supply Vcc and the second end of the driving coil 1200, and the fourth transistor T4 is connected between the first end of the driving coil 1200 and the ground.

The second path transistor group 1122 forms a second path of the driving signal Sdr applied to the driving coil 1200 depending on the control signals S_gate provided from the controller 1110. As an example, the control signals S_gate are provided to gates of the third transistor T3 and the fourth transistor T4. As an example, when the control signals S_gate are at a high level, the third transistor T3 and the fourth transistor T4 are turned on, and when the control signals S_gate are at a low level, the third transistor T3 and the fourth transistor T4 are turned off.

The first path transistor group 1121 and the second path transistor group 1122 form different paths of the driving signal Sdr applied to the driving coil 1200. As an example, an operation period of the first path transistor group 1121 may be the same as a non-operation period of the second path transistor group 1122, and a non-operation period of the first path transistor group 1121 may be the same an operation period of the second path transistor group 1122.

The operation periods are periods in which transistors of the first path transistor group 1121 and the second path transistor group 1122 are turned on, and the non-operation periods are periods in which the transistors of the first path transistor group 1121 and the second path transistor group 1122 are turned off.

That is, the first path transistor group 1121 and the second path transistor group 1122 are selectively operated depending on the control signals S_gate provided from the controller 1110. In the operation period of the first path transistor group 1121, the first transistor T1 and the second transistor T2 of the first path transistor group 1121 are turned on, and in the non-operation period of the second path transistor group 1122, the third transistor T3 and the fourth transistor T4 of the second path transistor group 1122 are turned off. In addition, in the non-operation period of the first path transistor group 1121, the first transistor T1 and the second transistor T2 of the first path transistor group 1121 are turned off, and in the operation period of the second path transistor group 1122, the third transistor T3 and the fourth transistor T4 of the second path transistor group 1122 are turned on.

Figure 6:
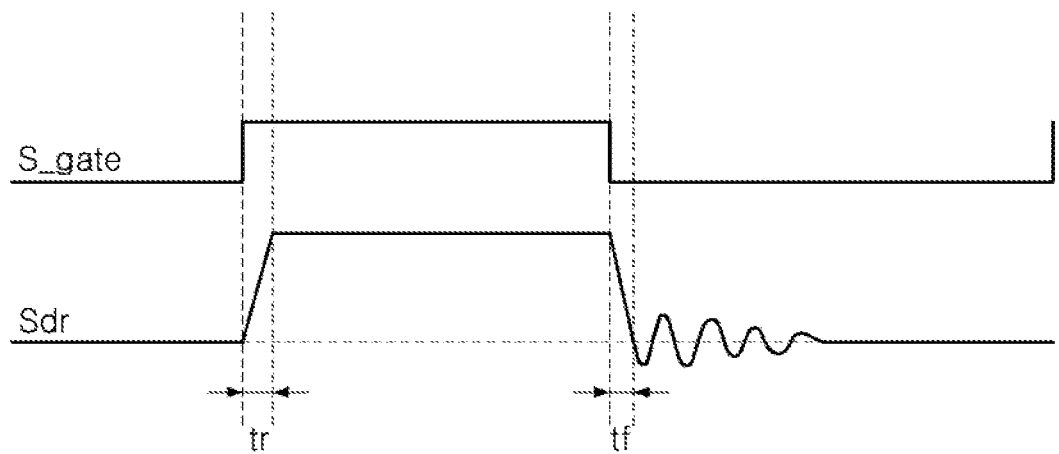
FIG. 6 is a graph illustrating examples of a control signal and a driving signal of a controller of FIGS. 4 and 5.

FIG. 6 is a graph illustrating examples of a control signal and a driving signal of a controller of FIGS. 4 and 5.

In FIG. 6, it is assumed that the control signals S_gate are provided to the first transistor T1 and the second transistor T2 of the first path transistor group 1121.

Referring to FIGS. 5 and 6, the first transistor T1 and the second transistor T2 are turned on at a point in time at which a level of the control signals S_gate changes from a low level to a high level. In a magnetizing time tr after the point in time at which the level of the control signal S_gate changes from the low level to the high level, the driving signal Sdr in a transient state is applied to the driving coil 1200, and after the magnetizing time tr, the driving signal Sdr in a steady state is applied to the driving coil 1200.

In addition, the first transistor T1 and the second transistor T2 are turned off at a point in time at which the level of the control signals S_gate changes from the high level to the low level. A demagnetizing time tf after the point in time at which the level of the control signals S_gate changes from the high level to the low level, the driving signal Sdr linearly decreases, and after the demagnetizing time tf, the driving signal Sdr applied to the driving coil 1200 is gradually attenuated. In detail, when the first transistor T1 and the second transistor T2 are switched from a turn-on operation to a turn-off operation, an LC oscillation occurs in an LC tank circuit formed by an inductance of the driving coil 1200 and a parasitic capacitance connected in parallel with the driving coil 1200, and a component of an oscillation signal Sosc is generated in the driving signal Sdr due to the LC oscillation. The oscillation signal is gradually attenuated by a parasitic resistance component (not illustrated) of the driving coil 1200. The frequency of the oscillation signal Sosc is determined by the inductance L of the driving coil 1200 and the parasitic capacitance C connected in parallel with the driving coil 1200. As an example, the frequency f of the oscillation signal Sosc may be represented by Equation 1 below.

$$f = \frac{1}{2\pi\sqrt{LC}} \quad (1)$$

The detection target 1300 is positioned in the range of the magnetic field of the driving coil 1200. Therefore, when the detection target 1300 made of either one or both of the magnetic material and the conductor moves together with the lens barrel 210, the strength of the magnetic field of the driving coil 1200 changes. and thus the inductance of the driving coil 1200 changes. Therefore, the frequency of the oscillation signal Sosc changes depending on the movement of the detection target 1300.

The position detector 1400 detects the displacement of the detection target 1300 based on the frequency of the oscillation signal Sosc. To increase a change ratio in the inductance of the driving coil 1200 depending on the displacement of the detection target 1300, a magnetic material having a high magnetic permeability may be disposed between the driving coil 1200 and the detection target 1300.

Figure 7A:
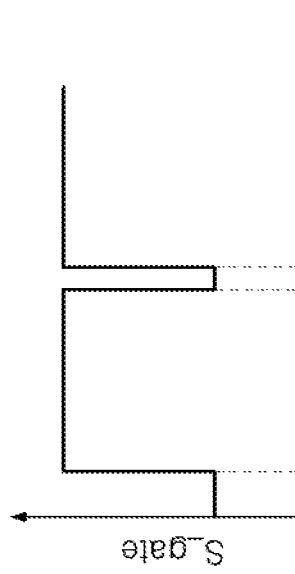
FIGS. 7A and 7B are graphs illustrating examples of control signals of the controller of FIGS. 4 and 5.
Figure 7B:
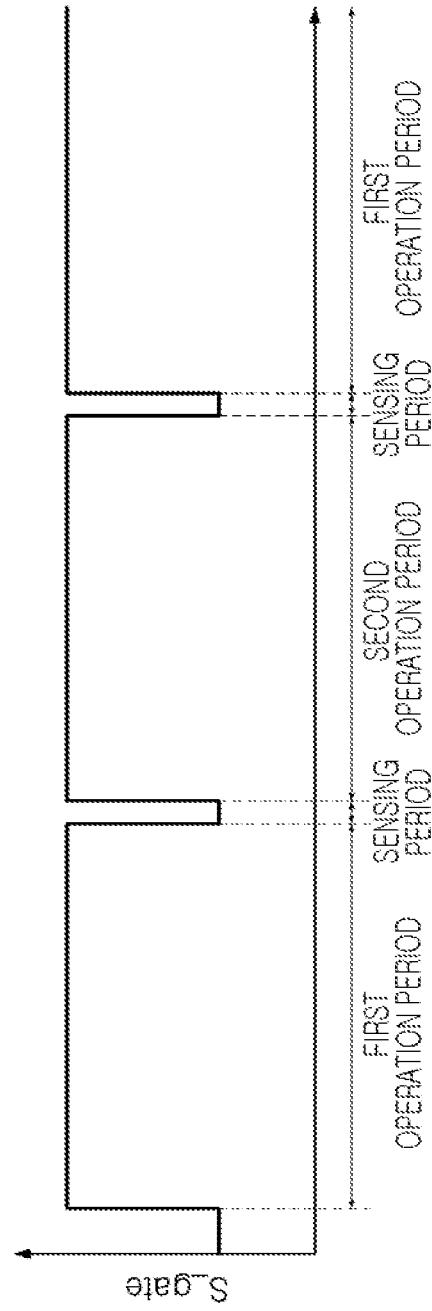

FIGS. 7A and 7B are graphs illustrating examples of control signals of the controller of FIGS. 4 and 5.

Referring to FIG. 7A, in one example, a sensing period for detecting the position of the detection target 1300 is provided in a first operation period of the first path transistor group 1121 and a second operation period of the second path transistor group 1122. A level of the control signals S_gate changes at least once from a high level to a low level for a predetermined time period in the sensing period within the first operation period and the second operation period, and the transistors of the first path transistor group 1121 and the second path transistor group 1122 are turned off at least once for the predetermined time period during the respective operation periods.

Referring to FIG. 7B, in another example, a sensing period for detecting the position of the detection target 1300 is provided in an operation switching period between a first operation period of the first path transistor group 1121 and a second operation period of the second path transistor group 1122. That is, the sensing period for detecting the position of the detection target 1300 is provided in the operation switching period between the first operation period and the second operation period.

As an example, after the first operation period of the first path transistor group 1121 ends, the position of the detection target 1300 is detected in the sensing period, and the second operation period of the second path transistor group 1122 then starts. Also, after the second operation period of the second path transistor group 1122 ends, the position of the detection target 1300 is detected in the sensing period, and the first operation period of the first path transistor group 1121 then starts.

Figure 8:
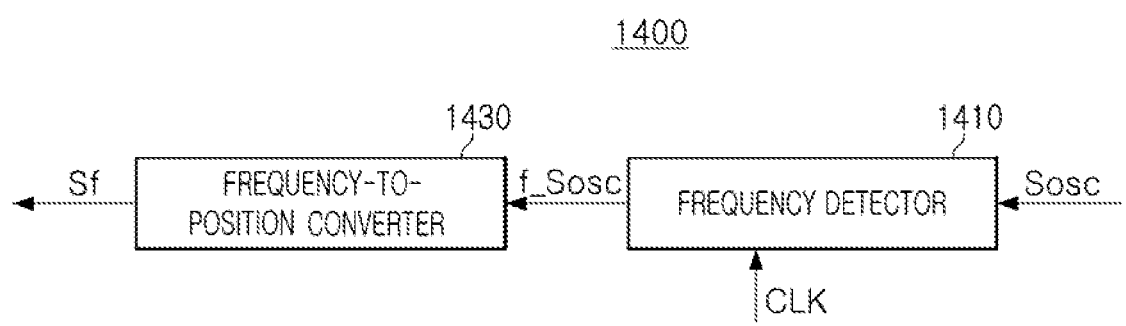
FIG. 8 is a block diagram illustrating an example of a position detector of FIGS. 3 and 4.

FIG. 8 is a block diagram illustrating an example of a position detector of FIGS. 3 and 4.

Referring to FIG. 8, an operation of detecting the position of the detection target 1300 performed by the position detector 1400 will hereinafter be described with reference to FIGS. 2 through 4.

The position detector 1400 includes a frequency detector 1410 and a frequency-to-position converter 1430.

The frequency detector 1410 detects a frequency f_Sosc of the oscillation signal Sosc generated by the LC oscillation in the sensing period for detecting the position of the detection target 1300. In one example, the frequency detector 1410 counts a number of cycles of the oscillation signal Sosc during a predetermined time period to detect the frequency f_Sosc of the oscillation signal Sosc. The frequency detector 1410 may detect the frequency f_Sosc of the oscillation signal Sosc using a reference clock CLK. In detail, the frequency detector 1410 counts a number of cycles of the oscillation signal Sosc during one cycle of the reference clock CLK, and calculates the frequency f_Sosc of the oscillation signal Sosc based on the number of counted cycles of the oscillation signal Sosc and a frequency of the reference clock CLK.

The frequency-to-position converter 1430 receives the frequency f_Sosc of the oscillation signal Sosc from the frequency detector 1410, and determines the position of the detection target 1300 based on the frequency f_Sosc of the oscillation signal Sosc. The frequency-to-position converter 1430 may include a memory, and position information of the detection target 1300 corresponding to the frequency f_Sosc of the oscillation signal Sosc may be stored in the memory, for example, in the form of a look-up table. The memory may be implemented by a non-volatile memory, such as a flash memory, an electrically erasable programmable read-only memory (EEPROM), and a ferroelectric random-access memory (FeRAM), but is not limited thereto.

When the frequency-to-position converter 1430 receives the frequency f_Sosc of the oscillation signal Sosc from the frequency detector 1410, the frequency-to-position converter 1430 determines the position of the detection target 1300 with reference to the position information of the detection target 1300 stored in the memory.

Figure 9:
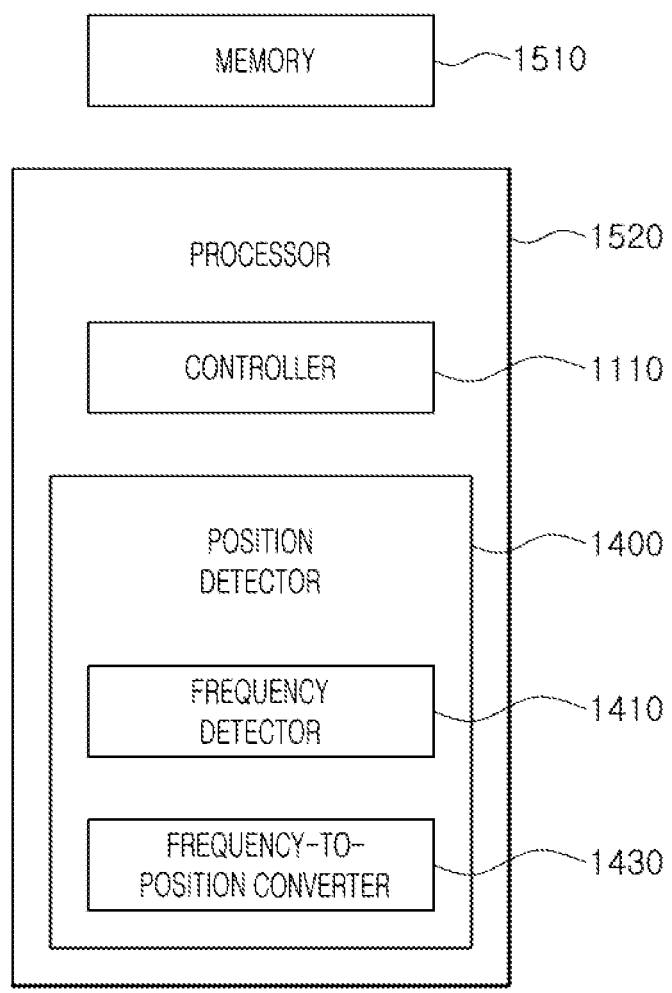
FIG. 9 is a block diagram illustrating an example of an actuator controller of the actuator of FIG. 3.

FIG. 9 is a block diagram illustrating an example of an actuator controller of the actuator of FIG. 3.

Referring to FIG. 9, an actuator controller 1500 includes a memory 1510 and a processor 1520. The memory 1510 stores instructions that, when executed by the processor 1520, cause the processor 1520 to perform the functions of the controller 1110 in FIGS. 3 to 5, the position detector 1400 in FIGS. 3, 4, and 8, and the frequency detector 1410 and the frequency-to-position converter 1430 in FIG. 8. Thus, the processor 1520 includes the controller 1110, the position detector 1400, the frequency detector 1410, and the frequency-to-position converter 1430.

The actuator of a camera module in the examples described above precisely detects the position of the detection target 1300 based on the change in the frequency of the oscillation signal Sosc caused by the change in the inductance of the driving coil 1200 as the detection target 1300 moves. Further, the actuator of a camera module does not use a separate Hall sensor, such that a manufacturing cost of the actuator of a camera module may be reduced and a space efficiency of the actuator of a camera module may be improved.

In the examples described above, the actuator of a camera module precisely detects the displacement of the lens barrel 210 based on the component of the oscillation signal Sosc generated in the driving signal when the level of the driving signal S_gate provided to the driving coil 1200 changes. Further, the actuator of a camera module does not use a separate Hall sensor, such that a manufacturing cost of the actuator of a camera module may be reduced and a space efficiency of the actuator of a camera module may be improved.

The driver 1100 and the position detector 1400 in FIG. 3, the driver 1100, the controller 1110, the driving circuit 1120, and the position detector 1400 in FIG. 4, the driver 1100, the controller 1110, and the driving circuit 1120 in FIG. 5, the position detector 1400, the frequency detector 1410, and the frequency-to-position converter 1430 in FIG. 8, and the actuator controller 1500, the memory 1510, the processor 1520, the controller 1110, the position detector 1400, the frequency detector 1410, and the frequency-to-position converter 1430 in FIG. 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, the actuator comprising:
    a driving coil disposed to face a detection target;
    a driving circuit comprising a plurality of transistors connected to the driving coil; and
    a processor configured to:
        provide a respective gate control signal to a gate of each of the plurality of transistors, and
        detect a displacement of the detection target based on a component of an oscillation signal generated in a driving signal applied to the driving coil in response to an operation of any one of the plurality of transistors being switched by the respective gate control signal.

2. The actuator of a camera model of claim 1, further comprising a memory configured to store instructions executable by the processor,
    wherein the processor is further configured to execute the instructions to configure the processor to:
        provide the respective gate control signal to the gate of each of the plurality of transistors, and
        detect the displacement of the detection target based on the component of the oscillation signal generated in the driving signal applied to the driving coil in response to the operation of any one of the plurality of transistors being switched by the respective gate control signal.

3. The actuator of a camera module of claim 1, wherein the processor is further configured to detect the displacement of the detection target based on the oscillation signal generated in the driving signal in response to any one of the plurality of transistors being switched from a turn-on operation to a turn-off operation.

4. The actuator of a camera module of claim 1, wherein the processor is further configured to count cycles of the oscillation signal to detect a frequency of the oscillation signal.

5. The actuator of a camera module of claim 4, wherein the frequency of the oscillation signal changes depending on the displacement of the detection target.

6. The actuator of a camera module of claim 5, wherein the detection target is positioned within a range of a magnetic field of the driving coil.

7. The actuator of a camera module of claim 6, wherein the detection target is disposed on one side of a lens barrel of the camera module.

8. The actuator of a camera module of claim 1, wherein the detection target comprises either one or both of a conductor and a magnetic material.

9. The actuator of a camera module of claim 1, wherein the oscillation signal is generated by an inductance of the driving coil and a parasitic capacitance connected in parallel with the driving coil.

10. The actuator of a camera module of claim 9, wherein the oscillation signal is generated by an LC oscillation of the inductance and the parasitic capacitance.

11. The actuator of a camera module of claim 1, wherein the driving circuit comprises:
    a first path transistor group forming a first path of the driving signal; and
    a second path transistor group forming a second path of the driving signal, the second path of the driving signal being different from the first path of the driving signal.

12. The actuator of a camera module of claim 11, wherein the oscillation signal is generated during a sensing period within either one or both of a first operation period of the first path transistor group and a second operation period of the second path transistor group.

13. The actuator of a camera module of claim 12, wherein in the sensing period, at least one transistor in a corresponding one of the first path transistor group and the second path transistor group is turned off for a predetermined time period.

14. The actuator of a camera module of claim 11, wherein the oscillation signal is generated in an operation switching period between a first operation period of the first path transistor group and a second operation period of the second path transistor group.

15. An actuator of a camera module, the actuator comprising:
    a lens barrel;
    a driving coil configured to provide a driving force to the lens barrel;
    a driver configured to provide a driving signal to the driving coil; and
    a processor configured to detect a displacement of the lens barrel based on a component of an oscillation signal generated in the driving signal in response to a change in a level of the driving signal provided to the driving coil.

16. The actuator of a camera module of claim 15, further comprising a memory configured to store instructions executable by the processor,
    wherein the processor is further configured to execute the instructions to configure the processor to detect the displacement of the lens barrel based on the component of the oscillation signal generated in the driving signal in response to the change in the level of the driving signal provided to the driving coil.

17. The actuator of a camera module of claim 15, wherein the processor is further configured to detect the displacement of the detection target based on a change in a frequency of the oscillation signal.

18. The actuator of a camera module of claim 15, wherein the processor is further configured to count cycles of the oscillation signal for a predetermined time period to detect a frequency of the oscillation signal.

19. A processor-implemented method of controlling an actuator of a camera module, the processor-implemented method comprising:
    providing a respective gate control signal to a gate of each of a plurality of transistors connected to a driving coil facing a detection target to periodically switch the plurality of transistors on and off to apply a driving signal to the driving coil to cause the driving coil to apply a driving force to the detection target to move the detection target; and
    detecting a displacement of the detection target based on an oscillation signal generated in the driving signal by the switching of the plurality of transistors, the oscillation signal having a frequency that varies as the detection target moves.

20. The processor-implemented method of controlling an actuator of a camera module of claim 19, wherein the driving signal causes a driving current to flow through the driving coil, and
    the periodically switching of the transistors on and off causes a direction of the driving current flowing through the driving coil to periodically reverse.

21. The processor-implemented method of controlling an actuator of a camera module of claim 19, wherein the oscillation signal is generated by oscillation of a tank circuit comprising an inductance of the driving coil and a parasitic capacitance connected in parallel with the inductance of the driving coil, and
    the oscillation of the tank circuit occurs in response to at least one of the plurality of transistors being turned off.

22. The processor-implemented method of controlling an actuator of a camera module of claim 19, wherein the detecting of the displacement of the detection target comprises:
    detecting a frequency of the oscillation signal; and
    converting the frequency of the oscillation signal to a position of the detection target.

* * * * *